(12) United States Patent
Liu et al.

(10) Patent No.: US 12,113,848 B2
(45) Date of Patent: Oct. 8, 2024

(54) METHOD AND SYSTEM FOR IMPLEMENTING BARE METAL INSPECTION PROCESS, DEVICE, AND STORAGE MEDIUM

(71) Applicant: INSPUR SUZHOU INTELLIGENT TECHNOLOGY CO., LTD., Jiangsu (CN)

(72) Inventors: Yuanfeng Liu, Jiangsu (CN); Yashuai Lei, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/281,689

(22) PCT Filed: Jan. 27, 2022

(86) PCT No.: PCT/CN2022/074375
§ 371 (c)(1),
(2) Date: Sep. 12, 2023

(87) PCT Pub. No.: WO2023/050667
PCT Pub. Date: Apr. 6, 2023

(65) Prior Publication Data
US 2024/0155023 A1  May 9, 2024

(30) Foreign Application Priority Data
Sep. 30, 2021  (CN) .......................... 202111155877.4

(51) Int. Cl.
*G06F 15/16* (2006.01)
*H04L 12/46* (2006.01)
(Continued)

(52) U.S. Cl.
CPC .......... *H04L 67/06* (2013.01); *H04L 12/4633* (2013.01); *H04L 12/4641* (2013.01); *H04L 49/354* (2013.01)

(58) Field of Classification Search
CPC . H04L 67/06; H04L 12/4633; H04L 12/4641; H04L 49/354; H04L 49/70; H04L 45/64
See application file for complete search history.

(56) References Cited

U.S. PATENT DOCUMENTS

| 9,596,135 B1 | 3/2017 | Thomas et al. |
| 2020/0285461 A1 | 9/2020 | Kumar et al. |

(Continued)

FOREIGN PATENT DOCUMENTS

| CN | 103024079 A | 4/2013 |
| CN | 109150624 A | 1/2019 |

(Continued)

*Primary Examiner* — John B Walsh
(74) *Attorney, Agent, or Firm* — IPro, PLLC (57) ABSTRACT

The present disclosure provides a method for implementing a bare metal inspection process, a system, a device and a medium. The method includes: installing an Openstack at a control node, installing a network interface card at a bare metal node, and installing an operating system in the network interface card, so that the network interface card generates a first bare metal port at the bare metal node, and in the operating system, generates a second bare metal port corresponding to the first bare metal port; establishing a communication channel between the Openstack and the operating system, and deploying a proxy component on the operating system; creating a first inspection port on the Openstack, creating a second inspection port based on the proxy component, and binding the second inspection port to the second bare metal port.

20 Claims, 3 Drawing Sheets

(51) Int. Cl.
*H04L 49/354* (2022.01)
*H04L 67/06* (2022.01)

(56) References Cited

U.S. PATENT DOCUMENTS

2022/0278927 A1* 9/2022 Mariappan ............ H04L 45/745
2022/0385570 A1* 12/2022 Miriyala ............... H04L 63/101

FOREIGN PATENT DOCUMENTS

| CN | 110495136 A | 11/2019 |
| CN | 111694519 A | 9/2020 |
| CN | 112486522 A | 3/2021 |
| CN | 112671578 A | 4/2021 |
| CN | 112799776 A | 5/2021 |
| CN | 112948008 A | 6/2021 |
| CN | 113127008 A | 7/2021 |
| CN | 113419815 A | 9/2021 |

* cited by examiner

METHOD AND SYSTEM FOR IMPLEMENTING BARE METAL INSPECTION PROCESS, DEVICE, AND STORAGE MEDIUM

CROSS-REFERENCE TO RELATED APPLICATION

This application claims the priority of the Chinese Patent application filed on Sep. 30, 2021 before the China National Intellectual Property Administration with the application number of 202111155877.4, and the title of "METHOD AND SYSTEM FOR IMPLEMENTING BARE METAL INSPECTION PROCESS, DEVICE, AND STORAGE MEDIUM", which is incorporated herein in its entirety by reference.

FIELD

The present disclosure relates to the field of cloud computing and, more particularly, to a method for implementing a bare metal inspection process, a system, a device, and a storage medium.

BACKGROUND

With the rapid development of the field of cloud computing, bare metal servers are a kind of computing servers that combines the flexibility of a virtual machine and the performance of a physical machine, and may provide exclusive cloud physical servers for individuals or enterprises. The bare metal servers may provide excellent computing performance and ensure data security for key application systems, high-performance computation, big data, core databases, and other services. When a bare metal cloud physical machine is created, of which the creating process may be just like creating a virtual machine, a required bare metal cloud physical machine may be created by merely specifying required hardware requirements (for example: a cpu memory), mirroring, and a required network. Furthermore, a user may flexibly apply for the required bare metal cloud physical machine for use on demand.

However, an implementation scheme of OVERLAY for a bare metal is different from a scheme of OVERLAY of a virtual machine on Openstack. An OVERLAY network is a virtual network established on an existing physical network, and has independent control and forwarding planes. For a terminal device (such as a server) connected to the OVERLAY, the physical network is transparent, thereby separation of a bearer network and a service network may be achieved.

For the Openstack virtual machine, resources of computing nodes may be shared and occupied, but the computing nodes are not exposed to the final users. Therefore, tunnels may be deployed on the computing nodes to achieve encapsulation and de-encapsulation of the OVERLAY of the virtual machines. However, in a bare metal scenario, the bare metal occupies one computing node alone. This computing node needs to be fully exposed to the final users. Therefore, the virtual machine OVERLAY implementation of deploying a tunnel on the computing node cannot be applied in the bare metal scenario.

There are currently two mainstream implementation schemes for the OVERLAY of the bare metal: (1) performing the encapsulation and the de-encapsulation of the OVERLAY on messages getting in and out of the bare metal on the physical exchange by using a hard software defined network (SDN), namely, by using a controlling a physical exchange; (2) performing encapsulation and de-encapsulation on messages getting in and out of the bare metal in an operating system of a smart network interface card by using a soft SDN under the help of the smart network interface card.

How to implement a bare metal inspection process is a very important step in the scheme of achieving the scheme of the OVERLAY of the bare metal with the help of the smart network interface card. Under an open virtual network (Ovn) and a smart network interface card, in the bare metal inspection process, information of hardware such as a central processing unit (cpu), an internal memory, and a hard disk of a bare metal node not only needs to be obtained, and a hos tname on the smart network interface card but also needs to be obtained. At present, the open source community only has the deployment scheme of the bare metal based on the smart network interface card implemented by the Openstack community based on neutron-openvswitch-agent and mellanox bluefield network interface card, and there is no implementation scheme of bare metal inspection.

SUMMARY

In view of this, embodiments of the present disclosure aim to provide a method for implementing a bare metal inspection process, a system, a computer device, and a computer-readable storage medium. The present disclosure achieves isolation and connection of an inspection network by using a proxy component inspur-inspect-agent, thus a bare metal inspection process is achieved in scenarios of a smart network interface card and an open virtual network.

Based on the object stated above, in an aspect, the embodiments of the present disclosure provide a method for implementing a bare metal inspection process, including the following steps: installing an Openstack at a control node, installing a network interface card at a bare metal node, and installing an operating system in the network interface card, so that the network interface card generates a first bare metal port at the bare metal node, and in the operating system, generates a second bare metal port corresponding to the first bare metal port; establishing a communication channel between the Openstack and the operating system, and deploying a proxy component on the operating system; creating a first inspection port (bm-inspect) on the Openstack, creating a second inspection port (ironic inspect port) based on the proxy component, and binding the second inspection port to the second bare metal port; and in response to receiving a flow table sent by the Openstack, obtaining a memory file system based on the first bare metal port, the second bare metal port and the first inspection port, collecting all hardware information of a current system by means of the memory file system, and sending the collected information to a bare metal server.

In some embodiments, installing the Openstack at the control node includes: setting internet protocol (IP) addresses of a deployment network and a trivial file transfer protocol service, and deploying the trivial file transfer protocol service at the control node.

In some embodiments, establishing the communication channel between the Openstack and the operating system includes: setting virtual tunnel endpoint IP addresses at the Openstack and the operating system, respectively, and setting a virtual network tunnel based on the virtual tunnel endpoint IP address.

In some embodiments, the method further includes: creating an inspection network, writing a universally unique identifier of the inspection network into a configuration file of the proxy component, and setting a hostname of the inspection network as a hostname corresponding to the second inspection port.

In some embodiments, the method further includes: determining whether a port exists under the hostname corresponding to the second inspection port in the inspection network; and in response to that a port exists under the hostname corresponding to the second inspection port in the inspection network, deleting the port.

In some embodiments, creating the first inspection port on the Openstack includes: creating the first inspection port on a network bridge of the Openstack, configuring an IP address corresponding to a network segment of the inspection network at the first inspection port, and starting the trivial file transfer protocol service to monitor the first inspection port.

In some embodiments, obtaining the memory file system based on the first bare metal port, the second bare metal port and the first inspection port includes: obtaining the memory file system according to a sequence of the first bare metal port, the second bare metal port, a network bridge on the operating system, the virtual network tunnel, the network bridge of the Openstack, the first inspection port, and the trivial file transfer protocol service.

In another aspect, the embodiments of the present disclosure further provide a system for implementing a bare metal inspection process, including: a deployment module configured to: install an Openstack at a control node, install a network interface card at a bare metal node, and install an operating system in the network interface card, so that the network interface card generates a first bare metal port at the bare metal node, and in the operating system, generates a second bare metal port corresponding to the first bare metal port; a communication module configured to: establish a communication channel between the Openstack and the operating system, and deploy a proxy component on the operating system; a port module, configured to: create a first inspection port on the Openstack, create a second inspection port based on the proxy component, and bind the second inspection port to the second bare metal port; and an execution module configured to: in response to receiving a flow table sent by the Openstack, obtain a memory file system based on the first bare metal port, the second bare metal port, and the first inspection port, collect all hardware information of a current system by means of the memory file system, and send the collected information to a bare metal server.

In another aspect, the embodiments of the present disclosure further provide a computer device, including: at least one processor; and a memory, the memory storing computer instructions runnable on the processor, and the instructions, when executed by the processor, implementing the steps of the method stated above.

In yet another aspect, the embodiments of the present disclosure further provide a computer-readable storage medium, the computer-readable storage medium stores a computer program, wherein the computer program, when executed by a processor, implements the steps of the method stated above.

The present disclosure at least has the following beneficial technical effects: the present disclosure achieves isolation and connection of an inspection network by using a proxy component inspur-inspect-agent, thus a bare metal inspection process is achieved in scenarios of a smart network interface card and an open virtual network.

BRIEF DESCRIPTION OF THE DRAWINGS

In order to explain the embodiments of the present disclosure or the technical solutions in the prior art more clearly, a brief description may be given below with reference to the accompanying drawings which are used in the description of the embodiments or the prior art, and it is obvious that the drawings in the description below are merely some embodiments of the present disclosure, and a person skilled in the art may obtain other embodiments according to these drawings without involving any inventive effort.

DETAILED DESCRIPTION

For clearer descriptions of the objectives, technical solutions, and advantages of the present disclosure, embodiments of the present disclosure are described hereinafter in detail with reference to embodiments and the accompanying drawings.

It should be noted that all expressions using "first" and "second" in the embodiments of the present disclosure are intended to distinguish two different entities or parameters with the same name. It may be seen that "first" and "second" are merely for the convenience of expressions and should not be construed as limiting the embodiments of the present disclosure, which may not be stated one by one in subsequent embodiments.

Figure 1:
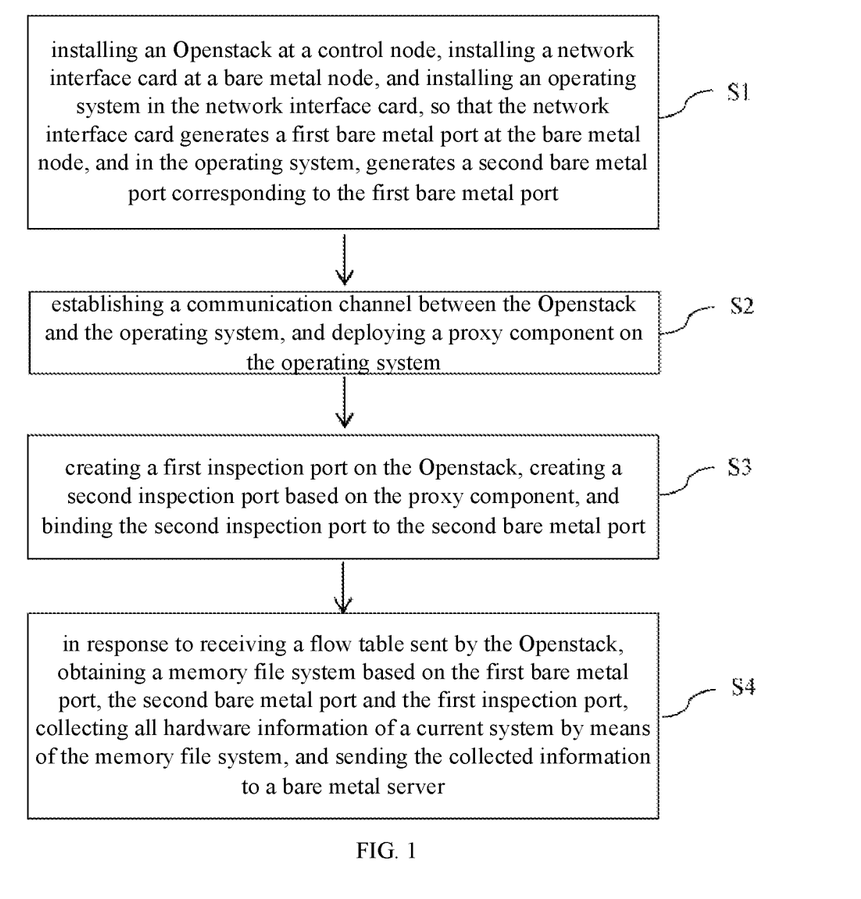
FIG. 1 is a schematic diagram of an embodiment of a method for implementing a bare metal inspection process according to the present disclosure.

A first aspect of embodiments of the present disclosure provides an embodiment of a method for implementing a bare metal inspection process. FIG. 1 shows a schematic diagram of an embodiment of a method for implementing a bare metal inspection process according to the present disclosure. As shown in FIG. 1, the embodiment of the present disclosure includes the following steps:

S1, installing an Openstack at a control node, installing a network interface card at a bare metal node, and installing an operating system in the network interface card, so that the network interface card generates a first bare metal port at the bare metal node, and in the operating system, generates a second bare metal port corresponding to the first bare metal port;

S2, establishing a communication channel between the Openstack and the operating system, and deploying a proxy component on the operating system;

S3, creating a first inspection port on the Openstack, creating a second inspection port based on the proxy component, and binding the second inspection port to the second bare metal port; and S4, in response to receiving a flow table sent by the Openstack, obtaining a memory file system based on the first bare metal port, the second bare metal port, and the first inspection port, collecting all hardware information of a current system by means of the memory file system, and sending the collected information to a bare metal server.

Figure 2:
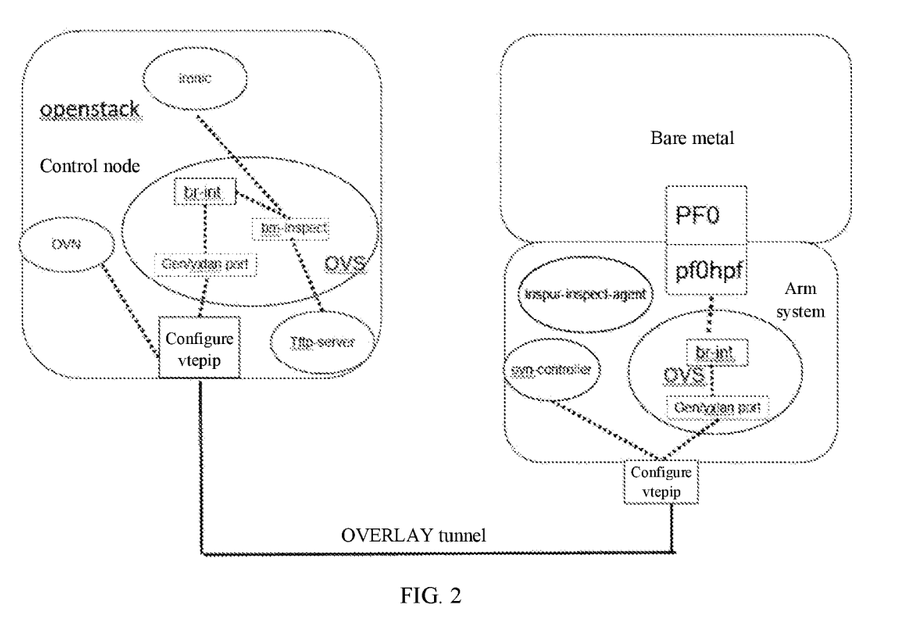
FIG. 2 is a hardware architecture diagram of an embodiment of the present disclosure.

FIG. 2 shows a hardware architecture diagram of an embodiment of the present disclosure. This embodiment of the present disclosure will be described with reference to FIG. 2. As shown in FIG. 2, this embodiment includes a control node and a bare metal node. The control node is shown on the left of FIG. 2, and the bare metal node is shown on the right of FIG. 2. The bare metal node includes a bare metal and a network interface card, and the network interface card includes an Arm operating system.

An Openstack is installed at the control node. The network interface card is installed at the bare metal node, and the operating system is installed in the network interface card, so that the network interface card generates a first bare metal port at the bare metal node, and in the operating system, generates a second bare metal port corresponding to the first bare metal port. An Openstack is installed at the control node, and the Openstack contains a neutron ironic nova component. An open virtual network (ovn) and an open virtual switch (ovs) are installed and deployed at the control node. A smart network interface card is installed at the bare metal side, and an operating system is installed in the smart network interface card. An ovn-controller and an ovs are installed on the operating system. The network interface card in the present embodiment adopts the bluefield2 smart network interface card introduced by Mellanox. After the smart network interface card is plugged into the bare metal node, the smart network interface card may generate a first bare metal port (PF0) on the system of the bare metal. Similarly, in the Arm operating system of the smart network interface card, there may also be a port, namely, a second bare metal port (pf0hpf), corresponding to the PF0 in the system of the bare metal.

In some implementations, installing the Openstack at the control node includes: setting internet protocol (IP) addresses of a deployment network and a trivial file transfer protocol service, and deploying the trivial file transfer protocol service at the control node. The IP addresses of the deployment network and the trivial file transfer protocol (tftp)-server are planned, and the tftp-server is deployed at the control node.

A communication channel between the Openstack and the operating system is established, and a proxy component is deployed on the operating system.

In some implementations, establishing the communication channel between the Openstack and the operating system includes: setting a virtual tunnel endpoint IP address at the Openstack and the operating system, respectively, and setting a virtual network tunnel based on the virtual tunnel endpoint IP address. The virtual tunnel endpoint (vtep) IP is planned and configured on a deployment node and the Arm operating system, and an OVERLAY tunnel is opened up. In the present embodiment of the present disclosure, the proxy component inspur-inspect-agent self-innovated by Inspur and running on the Arm system of the smart network interface card is mainly configured to get through the inspection network. The inspur-inspect-agent is deployed on the Arm of the smart network interface card in the form of a server, and performs enabling.

In some implementations, the method further includes: creating an inspection network, writing a universally unique identifier of the inspection network into a configuration file of the proxy component, and setting a hostname of the inspection network as a hostname corresponding to the second inspection port.

In some embodiments, the method further includes: determining whether a port exists under the hostname corresponding to the second inspection port in the inspection network; and in response to that a port exists under the hostname corresponding to the second inspection port in the inspection network, deleting the port.

A block process of designing the Inspur-inspect-agent software is as follows:

1, powering on the Inspur-inspect-agent;
2, performing initialization operation, including: (1) initializing a log module; (2) obtaining a medium access control (mac) address of the PF port of the bare metal on the Arm; (3) reading the configuration file to obtain the ip address of the tftp-server and obtain the universally unique identifier (uuid) of the inspection network; and (4) pulling up an ovn-controller server;
3, instantiating neutronclient;
4, processing the port of the current inspection network, including: (1) obtaining the port on the hostname of the current inspection network, and deleting it if any; (2) creating a port of the inspection network through the neutronclient, designating 'binding:host id':hostname, and creating the mac of the PF;
5, invoking os_vif.plug to bind the port id to the pf0hpf; and
6, updating dhcp opts of the inspection network to the newly created port.

A first inspection port is created on the Openstack; a second inspection port is created based on the proxy component; the second inspection port is bound to the second bare metal port.

In some embodiments, creating the first inspection port on the Openstack includes: creating the first inspection port on a network bridge of the Openstack, configuring an IP address corresponding to a network segment of the inspection network at the first inspection port, and starting the trivial file transfer protocol service to monitor the first inspection port. The first inspection port (bm-inspect) for an ovs internal port is created on the network bridge (br-int) of the Openstack. An ip address of a network segment of an inspection network is configured on the bm-inspect, and the tftp-server is started to monitor the bm-inspect port to provide a memory mirroring and file system of a bare metal inspection stage.

After the Openstack initiates a bare metal inspection operation, the bare metal may be powered off and then powered on to start a pre-boot execution environment (pxe). After the bare metal is powered on, the smart network interface card on the bare metal may also be powered on. Usually, the power on process of the smart network interface card is much earlier than the time point when the network interface card of the bare metal node starts the pxe. Therefore, when the network interface card of the bare metal performs the pxe, the inspur-inspect-agent has already created the second inspection port (ironic inspect port) and bound it to the pf0hpf. Ovn has issued a flow table of the inspection network. In a special scenario, an ionic conductor code process may be modified to ensure that the smart network interface card has been powered on and the port binding operation has been completed when the bare metal initiates a pxe request.

In response to receiving a flow table sent by the Openstack, a memory file system is obtained based on the first bare metal port, the second bare metal port, and the first inspection port; all hardware information of the current system is collected by means of the memory file system; and the collected information is sent to a bare metal server.

In some implementations, obtaining the memory file system based on the first bare metal port, the second bare metal port and the first inspection port includes: obtaining the memory file system according to a sequence of the first bare metal port, the second bare metal port, a network bridge on the operating system, the virtual network tunnel, the network bridge of the Openstack, the first inspection port, and the trivial file transfer protocol service. During the executing process of the pxe by the bare metal node, after a dynamic host configuration protocol (dhcp) obtains an address of a dhcp option tftp server in the flow table of the ovn and other dhcp option related information, the memory file system may be obtained through PF0→pf0hpf→br-int→vxlan tunnel→*br-int→*bm-inspect→*tftp-server. After the bare metal obtains the memory system, an ironic-python-agent (IPA, wherein the IPA is a server written by python, is used in the bare metal deployment inspection process and has different functions in different processes of the bare metal deployment inspection. In the present embodiment of the present disclosure, the IPA is used in the bare metal inspection process and is mainly used to collect hardware information of the bare metal) in the system may collect all the hardware information of the current system. The hardware information of the smart network interface card may be collected through a rshim server of a peripheral component interconnect (pci), and may be submitted to the ironic after all the required information is collected.

In the present embodiment of the present disclosure, an inspection network is created by using the neutron. The purpose of creation using the neutron is to manage the inspection network by the OVN, facilitating the isolation and connection of the inspection network, and the uuid of the created inspection network is written in the configuration file of the inspur-inspect-agent. The inspur-inspect-agent may read the configuration file and configuration information such as mac, tftp server ip, and hostname of the port PF of the bare metal when the inspur-inspect-agent is powered on. Next, all ports on the hostname of the current inspection network may be obtained through the neutronclient, and will be deleted if any. The mac is designated as the mac of the port PF, and the hostname is designated as the ironc-inspect port. An os_vif module is invoked to plug the port onto the br-int network bridge. At this time, whether the inspection network at the Arm side has been opened up is detected. Some dhcp options such as tftp server ip and next server are updated to an extra_dhcp_opts attribute of the port, the network interface card that initiates a dhcp request may obtain the address of the tftp-server.

The scheme of implementing the OVERLAY based on the bare metal has always been a technical difficulty in the prior art. This embodiment of the present disclosure may use the scheme of implementing the OVERLAY of the bare metal based on the smart network interface card to implement the bare metal inspection process, which provides a technical foundation for the implementation of the OVERLAY of the bare metal based on the smart network interface card and the OVN.

It should be particularly pointed out that the various steps in the various embodiments of the method for implementing the bare metal inspection process may cross, replace, add, or delete each other. Therefore, these reasonable permutations, combinations and transformations for the method for implementing the bare metal inspection process should also fall within the protection scope of the present disclosure, and the protection scope of the present disclosure should not be limited to the embodiments.

Figure 3:
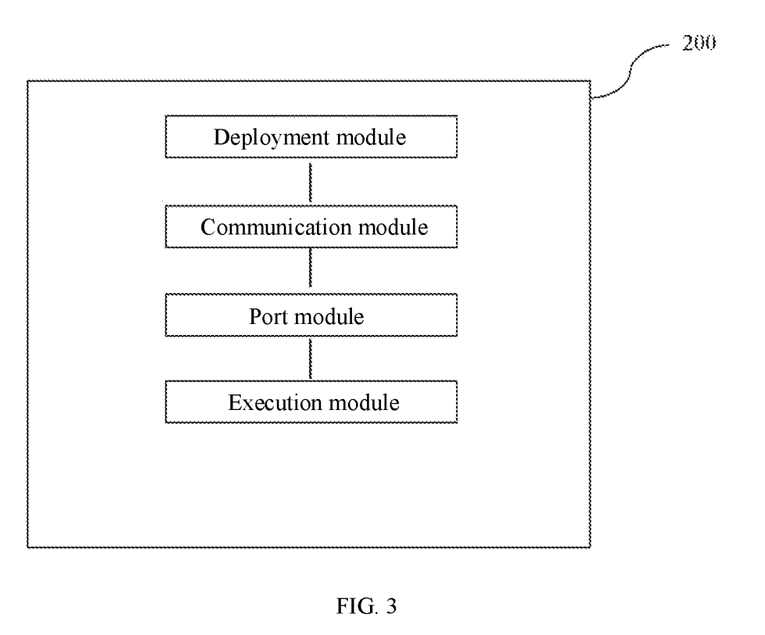
FIG. 3 is a schematic diagram of an embodiment of a system for implementing a bare metal inspection process according to the present disclosure.

Based on the above objective, a second aspect of embodiments of the present disclosure provides a system for implementing a bare metal inspection process. As shown in FIG. 3, the system 200 includes the following modules: a deployment module, configured to: install an Openstack at a control node, install a network interface card at a bare metal node, and install an operating system in the network interface card, so that the network interface card generates a first bare metal port at the bare metal node, and in the operating system, generates a second bare metal port corresponding to the first bare metal port; a communication module, configured to: establish a communication channel between the Openstack and the operating system, and deploy a proxy component on the operating system; a port module, configured to: create a first inspection port on the Openstack, create a second inspection port based on the proxy component, and bind the second inspection port to the second bare metal port; and an execution module, configured to: in response to receiving a flow table sent by the Openstack, obtain a memory file system based on the first bare metal port, the second bare metal port, and the first inspection port, collect all hardware information of the current system by means of the memory file system, and send the collected information to a bare metal server.

In some implementations, the deployment module is configured for setting internet protocol (IP) addresses of a deployment network and a trivial file transfer protocol service, and deploying the trivial file transfer protocol service at the control node.

In some implementations, the communication module is configured to: set virtual tunnel endpoint IP addresses at the Openstack and the operating system respectively, and set a virtual network tunnel based on the virtual tunnel endpoint IP address.

In some implementations, the system further includes a network module, configured to: create an inspection network, write a universally unique identifier of the inspection network into a configuration file of the proxy component, and set a hostname of the inspection network as a hostname corresponding to the second inspection port.

In some embodiments, the system further includes a determining module, configured to: determine whether a port exists under the hostname corresponding to the second inspection port in the inspection network; and in response to that a port exists under the hostname corresponding to the second inspection port in the inspection network, delete the port.

In some embodiments, the port module is configured to: create the first inspection port on a network bridge of the Openstack, configure an IP address corresponding to a network segment of the inspection network at the first inspection port, and start the trivial file transfer protocol service to monitor the first inspection port.

In some implementations, the execution module is configured to obtain the memory file system according to a sequence of the first bare metal port, the second bare metal port, a network bridge on the operating system, the virtual network tunnel, the network bridge of the Openstack, the first inspection port and the trivial file transfer protocol service.

Based on the above objective, a third aspect of the embodiments of the present disclosure provides a computer device, including: at least one processor; and a memory. The memory stores computer instructions runnable on the processor. The instructions, when executed by the processor, implement the following steps: S1, installing an Openstack at a control node, installing a network interface card at a bare metal node, and installing an operating system in the network interface card, so that the network interface card generates a first bare metal port at the bare metal node, and in the operating system, generates a second bare metal port corresponding to the first bare metal port; S2, establishing a communication channel between the Openstack and the operating system, and deploying a proxy component on the operating system; S3, creating a first inspection port on the Openstack, creating a second inspection port based on the proxy component, and binding the second inspection port to the second bare metal port; and S4, in response to receiving a flow table sent by the Openstack, obtaining a memory file system based on the first bare metal port, the second bare metal port, and the first inspection port, collecting all hardware information of a current system by means of the memory file system, and sending the collected information to a bare metal server.

In some implementations, installing the Openstack at the control node includes: setting internet protocol (IP) addresses of a deployment network and a trivial file transfer protocol service, and deploying the trivial file transfer protocol service at the control node.

In some implementations, establishing the communication channel between the Openstack and the operating system includes: setting virtual tunnel endpoint IP addresses at the Openstack and the operating system, respectively, and setting a virtual network tunnel based on the virtual tunnel endpoint IP address.

In some implementations, steps further include: creating an inspection network, writing a universally unique identifier of the inspection network into a configuration file of the proxy component, and setting a hostname of the inspection network as a hostname corresponding to the second inspection port.

In some embodiments, steps further include: determining whether a port exists under the hostname corresponding to the second inspection port in the inspection network; and in response to that a port exists under the hostname corresponding to the second inspection port in the inspection network, deleting the port.

In some embodiments, creating the first inspection port on the Openstack includes: creating the first inspection port on a network bridge of the Openstack, configuring an IP address corresponding to a network segment of the inspection network at the first inspection port, and starting the trivial file transfer protocol service to monitor the first inspection port.

In some implementations, obtaining the memory file system based on the first bare metal port, the second bare metal port, and the first inspection port includes: obtaining the memory file system according to a sequence of the first bare metal port, the second bare metal port, a network bridge on the operating system, the virtual network tunnel, the network bridge of the Openstack, the first inspection port, and the trivial file transfer protocol service.

Figure 4:
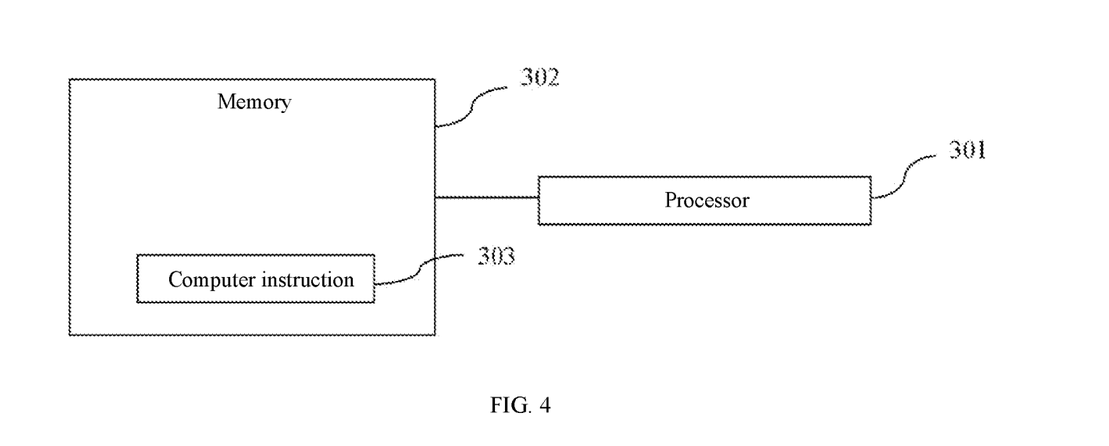
FIG. 4 is a schematic diagram of a hardware structure of an embodiment of a computer device for implementing a bare metal inspection process according to the present disclosure.

FIG. 4 shows a schematic diagram of a hardware structure of an embodiment of a computer device for implementing the above bare metal inspection process according to the present disclosure.

The apparatus as shown in FIG. 4 is taken as an example. The apparatus includes a processor 301 and a memory 302.

The processor 301 and the memory 302 may be connected by a bus or in other ways. In FIG. 4, bus connection is taken as an example.

The memory 302 is used as a non-volatile computer-readable storage medium that may be configured to store non-volatile software programs, non-volatile computer executable programs, and modules, for example, program instructions/modules corresponding to the method for implementing the bare metal inspection process in the embodiments of the present disclosure. The processor 301 runs the non-volatile software programs, instructions, and modules stored in the memory 302, so as to perform various functional applications and data processing of a server, thus implementing the method for implementing the bare metal inspection process.

The memory 302 may include a program storage region and a data storage region. The program storage region may store an operating system and an application program required by at least one function. The data storage region may store data created according to the use of the method for implementing the bare metal inspection process. In addition, the memory 302 may include a high-speed random access memory, and may further include a non-volatile memory, such as at least one magnetic disk storage device, a flash memory device, or other volatile solid-state storage devices. In some embodiments, the memory 302 includes memories remotely disposed with respect to the processor 301, and these remote memories may be connected to a local module through a network. Examples of the above network include, but are not limited to, the Internet, an intranet, a local area network, a mobile communication network, and combinations thereof.

The computer instructions 303 corresponding to one or more methods for implementing the bare metal inspection process are stored in the memory 302. When executed by the processor 301, the computer instructions implement the method for implementing the bare metal inspection process in any method embodiment above.

Any one embodiment of the computer device that executes the above method for implementing the bare metal inspection process may achieve the same or similar effect as or to any foregoing corresponding method embodiment.

The present disclosure further provides a computer-readable storage medium. The computer-readable storage medium stores a computer program which performs the method for implementing the bare metal inspection process when executed by a processor.

Figure 5:
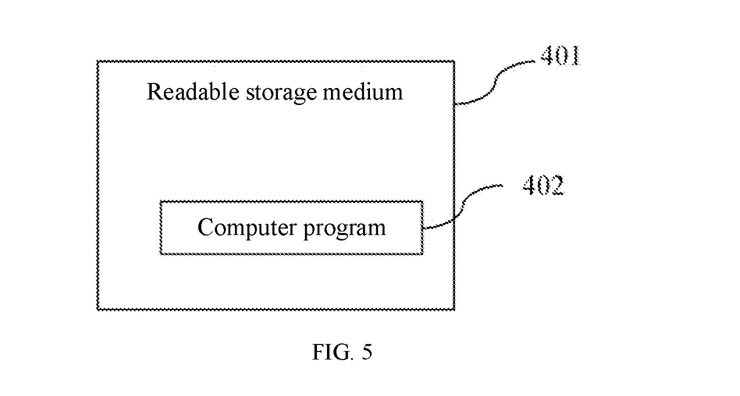
FIG. 5 is a schematic diagram of an embodiment of a computer storage medium for implementing a bare metal inspection process according to the present disclosure.

FIG. 5 shows a schematic diagram of an embodiment of a computer storage medium for implementing a bare metal inspection process according to the present disclosure. The computer storage medium as shown in FIG. 5 is taken as an example. The computer-readable storage medium 401 stores a computer program 402 which performs the above method when executed by a processor.

It should be finally noted that those of ordinary skill in the art may understand that implementation of all or a part of the processes in the method of the foregoing embodiment may be completed by the computer program that instructs relevant hardware. The programs of the method for implementing the bare metal inspection process may be stored in the computer-readable storage medium. The programs may include the processes of the embodiments of the foregoing methods when executed. The storage medium of the programs may be a magnetic disk, an optical disk, a read-only memory (ROM), a random access memory (RAM), or the like. The embodiment of the above computer program may achieve the same or similar effects as or to any corresponding method embodiment mentioned above.

The above is an exemplary embodiment of the present disclosure, but it should be noted that various changes and modifications may be made without deviating from the scope disclosed by the embodiments of present disclosure, which is limited by the claim. The functions, steps and/or actions of the method claims according to the embodiment disclosed described here do not need to be performed in any particular order. In addition, although the elements disclosed in the embodiments of the present disclosure may be described or required in an individual form, they may be understood as multiple unless explicitly limited to singular.

It should be understood that what is used herein, unless the context clearly supports exceptions, the singular form 'one' is intended to also include the plural form. It should also be understood that the 'and/or' used herein refers to any and all possible combinations of items that include one or more items listed in association.

That the above-mentioned embodiments of the present disclosure disclose the serial number of the embodiments is only for description, not for the merits of the embodiments.

A person skilled in the art may understand that all or some of the steps for implementing the above embodiments may be completed by hardware, and may also be completed by using a program to instruct relevant hardware. The program may be stored in a computer-readable storage medium. The above-mentioned storage medium may be a read-only memory, a magnetic disk, an optical disk and so on.

A person skilled in the art should understand that the discussion on any of the above embodiments is merely illustrative, and are not intended to imply that the scope (including the claims) of the embodiments of the present disclosure is limited to those examples. With the concept of the embodiments of the present disclosure, the embodiments or the technical features of different embodiments may be combined, and many other variations of different aspects of the embodiments of the present disclosure as stated above may exist, which are not provided in detail for brevity. Therefore, any omissions, modifications, equivalent substitutions and improvements that are made within the spirit and the principle of the embodiments of the present disclosure should fall within the protection scope of the embodiments of the present disclosure.

The invention claimed is:

1. A method for implementing a bare metal inspection process, comprising:
    installing an Openstack at a control node, installing a network interface card at a bare metal node, and installing an operating system in the network interface card, so that the network interface card generates a first bare metal port at the bare metal node, and in the operating system, generates a second bare metal port corresponding to the first bare metal port;
    establishing a communication channel between the Openstack and the operating system, and deploying a proxy component on the operating system;
    creating a first inspection port on the Openstack, creating a second inspection port based on the proxy component, and binding the second inspection port to the second bare metal port; and
    in response to receiving a flow table sent by the Openstack, obtaining a memory file system based on the first bare metal port, the second bare metal port and the first inspection port, collecting all hardware information of a current system by means of the memory file system, and sending the collected information to a bare metal server.

2. The method according to claim 1, wherein installing the Openstack at the control node comprises:
    setting internet protocol (IP) addresses of a deployment network and a trivial file transfer protocol service, and deploying the trivial file transfer protocol service at the control node.

3. The method according to claim 1, wherein establishing the communication channel between the Openstack and the operating system comprises:
    setting virtual tunnel endpoint IP addresses at the Openstack and the operating system, respectively, and setting a virtual network tunnel based on the virtual tunnel endpoint IP address.

4. The method according to claim 3, wherein the method further comprises:
    creating an inspection network, writing a universally unique identifier of the inspection network into a configuration file of the proxy component, and setting a hostname of the inspection network as a hostname corresponding to the second inspection port.

5. The method according to claim 4, wherein the method further comprises:
    determining whether a port exists under the hostname corresponding to the second inspection port in the inspection network; and
    in response to that a port exists under the hostname corresponding to the second inspection port in the inspection network, deleting the port.

6. The method according to claim 4, wherein creating the first inspection port on the Openstack comprises:
    creating the first inspection port on a network bridge of the Openstack, configuring an IP address corresponding to a network segment of the inspection network at the first inspection port, and starting the trivial file transfer protocol service to monitor the first inspection port.

7. The method according to claim 6, wherein obtaining the memory file system based on the first bare metal port, the second bare metal port and the first inspection port comprises:
    obtaining the memory file system according to a sequence of the first bare metal port, the second bare metal port, a network bridge on the operating system, the virtual network tunnel, the network bridge of the Openstack, the first inspection port and the trivial file transfer protocol service.

8. A computer device, comprising:
    at least one processor; and
    a memory, the memory storing computer instructions runnable on the processor, and the instructions, when executed by the processor, implementing the steps of the method according to claims 1.

9. A non-transitory computer-readable storage medium, the computer-readable storage medium stores a computer program, wherein the computer program, when executed by a processor, implements the steps of the method according to claims 1.

10. The method according to claim 1, wherein the Openstack comprises a neutron ironic nova component.

11. The method according to claim 1, wherein the method further comprises:
    installing and deploying an open virtual network (ovn) and an open virtual switch (ovs) at the control node.

12. The method according to claim 1, wherein the method further comprises:
    installing a smart network interface card at the bare metal side, and installing an ovn-controller and an ovs on the operating system.

13. The method according to claim 3, wherein setting the virtual tunnel endpoint IP addresses at the Openstack and the operating system, respectively, and setting the virtual network tunnel based on the virtual tunnel endpoint IP address comprises:
    planning and configuring a virtual tunnel endpoint IP on a deployment node and the operating system, and opening up an overlay tunnel.

14. The computer device according to claim 8, wherein installing the Openstack at the control node comprises:
  setting internet protocol (IP) addresses of a deployment network and a trivial file transfer protocol service, and deploying the trivial file transfer protocol service at the control node.

15. The computer device according to claim 8, wherein establishing the communication channel between the Openstack and the operating system comprises:
  setting virtual tunnel endpoint IP addresses at the Openstack and the operating system, respectively, and setting a virtual network tunnel based on the virtual tunnel endpoint IP address.

16. The computer device according to claim 15, wherein the method further comprises:
  creating an inspection network, writing a universally unique identifier of the inspection network into a configuration file of the proxy component, and setting a hostname of the inspection network as a hostname corresponding to the second inspection port.

17. The computer device according to claim 16, wherein the method further comprises:
  determining whether a port exists under the hostname corresponding to the second inspection port in the inspection network; and
  in response to that a port exists under the hostname corresponding to the second inspection port in the inspection network, deleting the port.

18. The computer device according to claim 16, wherein creating the first inspection port on the Openstack comprises:
  creating the first inspection port on a network bridge of the Openstack, configuring an IP address corresponding to a network segment of the inspection network at the first inspection port, and starting the trivial file transfer protocol service to monitor the first inspection port.

19. The computer device according to claim 18, wherein obtaining the memory file system based on the first bare metal port, the second bare metal port and the first inspection port comprises:
  obtaining the memory file system according to a sequence of the first bare metal port, the second bare metal port, a network bridge on the operating system, the virtual network tunnel, the network bridge of the Openstack, the first inspection port and the trivial file transfer protocol service.

20. The non-transitory computer-readable storage medium according to claim 9, wherein installing the Openstack at the control node comprises:
  setting IP addresses of a deployment network and a trivial file transfer protocol service, and deploying the trivial file transfer protocol service at the control node.

* * * * *